United States Patent
Asthana et al.

(10) Patent No.: US 7,089,020 B2
(45) Date of Patent: Aug. 8, 2006

(54) METHOD AND APPARATUS FOR LOCATION MARKING

(75) Inventors: Atul Asthana, Unionville (CA); Bryan Taylor, Kitchener (CA)

(73) Assignee: Research in Motion Limited, Waterloo (CA)

( * ) Notice: Subject to any disclaimer, the term of this patent is extended or adjusted under 35 U.S.C. 154(b) by 150 days.

(21) Appl. No.: 10/787,237

(22) Filed: Feb. 27, 2004

(65) Prior Publication Data

US 2005/0192030 A1   Sep. 1, 2005

(51) Int. Cl.
*H04Q 7/20* (2006.01)

(52) U.S. Cl. .............................. 455/456.1; 455/456.2; 455/456.3

(58) Field of Classification Search ............. 455/422.1, 455/456.1, 456.2, 456.6, 457, 459, 404.2, 455/456.3; 709/205; 340/539.13, 539.17, 340/539.21, 995.18; 701/201–213; 705/1, 705/25, 38, 39
See application file for complete search history.

(56) References Cited

U.S. PATENT DOCUMENTS

| | | | | |
|---|---|---|---|---|
| 5,740,538 A | * | 4/1998 | Joyce et al. | 455/456.2 |
| 6,678,613 B1 | * | 1/2004 | Andrews et al. | 701/213 |
| 6,958,692 B1 | * | 10/2005 | Ratschunas | 340/539.13 |
| 7,016,855 B1 | * | 3/2006 | Eaton et al. | 705/1 |
| 2002/0193150 A1 | | 12/2002 | Pritchard | |
| 2003/0005060 A1 | * | 1/2003 | Davidson et al. | 709/206 |

FOREIGN PATENT DOCUMENTS

| | | |
|---|---|---|
| EP | 0777399 | 4/1997 |
| GB | 2352128 | 1/2001 |
| WO | WO 01/20409 A2 | 3/2001 |
| WO | WO 01/74011 | 10/2001 |
| WO | WO 03/105501 | 12/2003 |
| WO | WO 2004/004372 | 1/2004 |

OTHER PUBLICATIONS

European Search Report dated Jul. 26, 2004, issued on European Patent No. Application No. 04251162.
Anonymous: "Mobile phone using user-defined, location-dependent profiles" Research Disclosure, Kenneth Mason Publications, Hampshire, GB, vol. 438, No. 21, Oct. 2000, XP007126889, ISSN: 0374-4353.

* cited by examiner

*Primary Examiner*—Jean A Gelin
(74) *Attorney, Agent, or Firm*—T. Andrew Currier; Torys LLP

(57) ABSTRACT

The present invention relates to a novel apparatus and method for location marking. In an embodiment, an electronic device is operable to identify it's location depending on the combination of base stations it receives signals from. Different geographic regions are defined and can be identified and renamed by the user based on the unique combination of base station ID's receivable in each geographic location. The embodiment described herein allows user handsets to continuously track location as they move. Applications in the electronic device can then be configured to respond in different manners depending on the location of the electronic device.

24 Claims, 16 Drawing Sheets

METHOD AND APPARATUS FOR LOCATION MARKING

FIELD OF INVENTION

The present invention relates generally to wireless communication systems and electronic devices and more particularly to a method and apparatus for location marking.

BACKGROUND

One of the recent uses of wireless networks has been location identification. Increasing number of mobile service providers are implementing the capability to locate mobile phones within their wireless networks. Mobile service providers use this capability to provide certain functionality to their subscribers, such as E911, or to enhance the experience of a subscriber when using a particular application.

Several different techniques have been used in order to locate mobile phones within wireless networks. High accuracy positioning methods, which provide better location identification, form one group of technologies. Time difference of arrival (TDOA) and Enhanced Observed Time Difference (E-OTD) location determination is based on the slight delays caused by the distance differences between the subscriber and the different antennas. These methods compare differences in arrival times of wireless signals between at least 3 different antennas to make the location determination. Assisted GPS (A-GPS) is another technology which can be used for high accuracy location identification. A GPS transceiver, attached to or integrated in the subscriber device, is used to determine the phone's coordinates. This is done in cooperation with the base stations. There is also a low accuracy method in use, generally known as the Cell-ID method. This method relies on the fact that in a wireless cell network, each location is served by a discrete cell. Thus, the location of a mobile subscriber can be determined when a mobile subscriber enters an area served by a particular cell.

High accuracy location identification systems are generally expensive to install, slow to deliver locations and which involve a discrete user request to locate, from an operator. A typical E-OTD installation may require software upgrades to the network, the addition of E-OTD chips to the user devices, and the addit of a hardware component to the network's base stations. TDOA doesn't require any modifications to the handset, but in a typical setup, equipment has to be added to tens of thousands of base stations. These methods also typically entail "assistance" from the operator, and hence may involve a charge for doing individual location identification. Moreover, since information is usually communicated to the base stations, there is also additional power drainage from the handsets. Low accuracy systems, on the other hand, can suffer from poor precision. The precision of the coordinate identification depends on the size of the cell; the larger the cell size, the poorer the precision.

These limitations make the use of these systems impractical for "location-aware" applications that run in the background. These applications, which need to continually identify a subscriber's location, need a methodology which will enable location identification inexpensively, and without user intervention. Moreover, these location identifications should be done with greater accuracy then typically provided by the Cell-ID method, though the precision of the high accuracy methods is not needed.

SUMMARY OF THE INVENTION

It is an object of the present invention to provide a novel system, apparatus and method for location marking that obviates or mitigates at least one of the above-identified disadvantages.

According to one aspect of the present invention, there is provided a wireless communication system that includes a first base station set that is operable to wirelessly transmit across a first geographic range; and a second base station set that is similarly operable across a second geographic range. The system also includes a subscriber device that wirelessly receives a first identifier from the first base station set when the device is in the first geographic range, and receives a second identifier from the second base station set when the device is in the second geographic range.

For seamless roaming, operators place base stations close enough so that a handset is able to receive signals from one or more base stations simultaneously. In dense urban areas, a handset would be able to "hear" a multitude of base stations from different operators while in rural areas it may only be able to "hear" one base station.

A typical handset normally builds an internal table listing the base station ID, the frequency band(s) being used by that base station, the received power level per frequency band and other detailed information. This information is typically used for the handset to decide on which base stations it should camp on, when it should try and roam to another cell, and what power level it should use for transmitting information to the base station. Additionally, the power levels, for each frequency, received by a handset are typically different in different locations. This is based on network planning recommendations made by operator staff, for that location and hence provides a mechanism to mark location based on the top three or four power levels for frequency bands for a base station.

In the simple case of a rural setting with a single base station, the handset would be able to hear two base stations (at cell edges—where cells overlap) to a single base station. Here the handset would be limited to marking its location based on the base station(s) it hears as well as the top three or four frequency band power levels.

In an urban setting, the handset would be able to hear a number of base stations, their frequency bands and power levels. The set of top (by power level) base stations heard would identify a rough location for the user. As the handset moves, it is continuously receiving and updating this data from different base stations and hence is capable of marking approximate location as well as informing applications, through a location event, that the handset is in a particular "marked location".

The device also stores user-defined location associated with each identifier.

BRIEF DESCRIPTION OF THE DRAWINGS

Certain embodiments of the present invention will now be described, by way of example only, with reference to the attached figures, wherein.

DETAILED DESCRIPTION OF THE INVENTION

Figure 1:
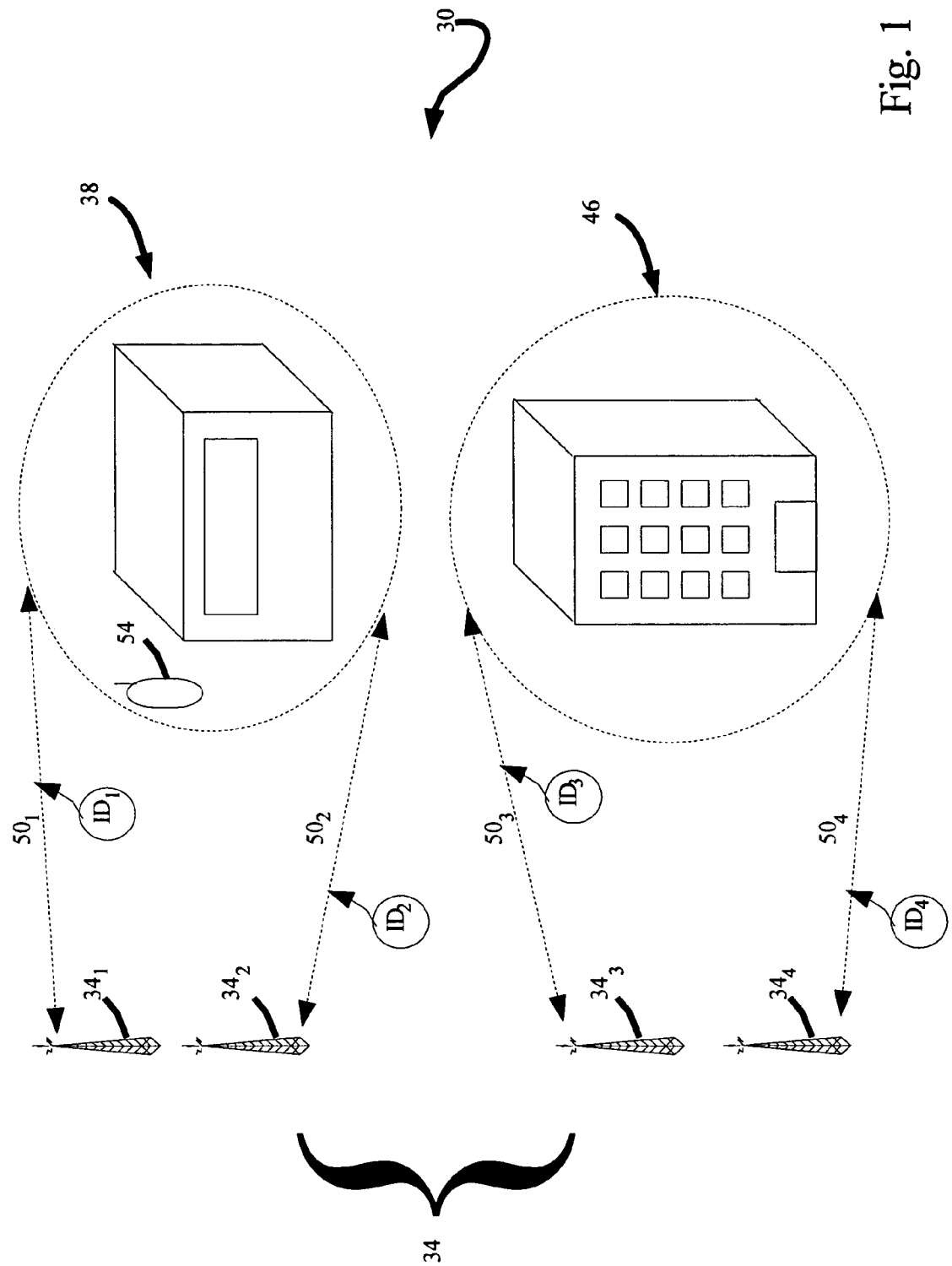
FIG. 1 is a schematic representation of a wireless communication system in accordance an embodiment of the invention.

Referring now to FIG. 1, a wireless communication system in accordance with a first embodiment of the invention is indicated generally at 30. System 30 comprises a plurality of base stations 34 operable to wirelessly transceive across a variety of geographic ranges. In a present embodiment, base stations $34_1$ and $34_2$ comprise a first set of base stations that transceive across a first geographic range 38. Base stations $34_3$ and $34_4$ comprise a second set of base stations that transceive across geographic range 46. Base stations 34 communicate wirelessly over a plurality of channels 50. More specifically, base stations $34_1$ and $34_2$ collectively cover first geographic range 38 by transmitting and receiving signals through channels $50_1$ and $50_2$ base stations $34_3$ and $34_4$ collectively cover second geographic range 46 through wireless channels $50_3$ and $50_4$. In a present embodiment, system 30 is based on a known voice-based wireless telecommunication such as Global System for Mobile Communications ("GSM") or Code Division Multiple Access ("CDMA").

System 30 also includes a subscriber device 54 operable to communicate with each base station 34, through its respective link 50 each time device 54 is located within a range respective to a set of base stations 34. For example, whenever device 54 is located within geographic range 38, device 54 will be communicating with at least one of base stations $34_1$ and $34_2$ through channels $50_1$ and $50_2$, respectively, and whenever device 54 is located within geographic range 46, device 54 will be communicating with at least one of base stations $34_3$ and $34_4$ through channels $50_3$ and $50_4$, respectively. Various types of information can be communicated through channels 50, including voice communications, data communications etc. In particular, links 50 each carry a base station identifier ID, that identifies the base station 34 that carries that particular link 50. For example, if device 54 is located within geographic range 38, device 54 would receive identifier $ID_1$ through link $50_1$ and would receive identifier $ID_2$ through link 502. However if device 54 moves just outside of that region, device 54 can receive information only from one of the channels, or device 54 can not receive information from either link $50_1$ or $50_2$, both of which would indicate that device 54 is no longer within region 38.

Figure 2:
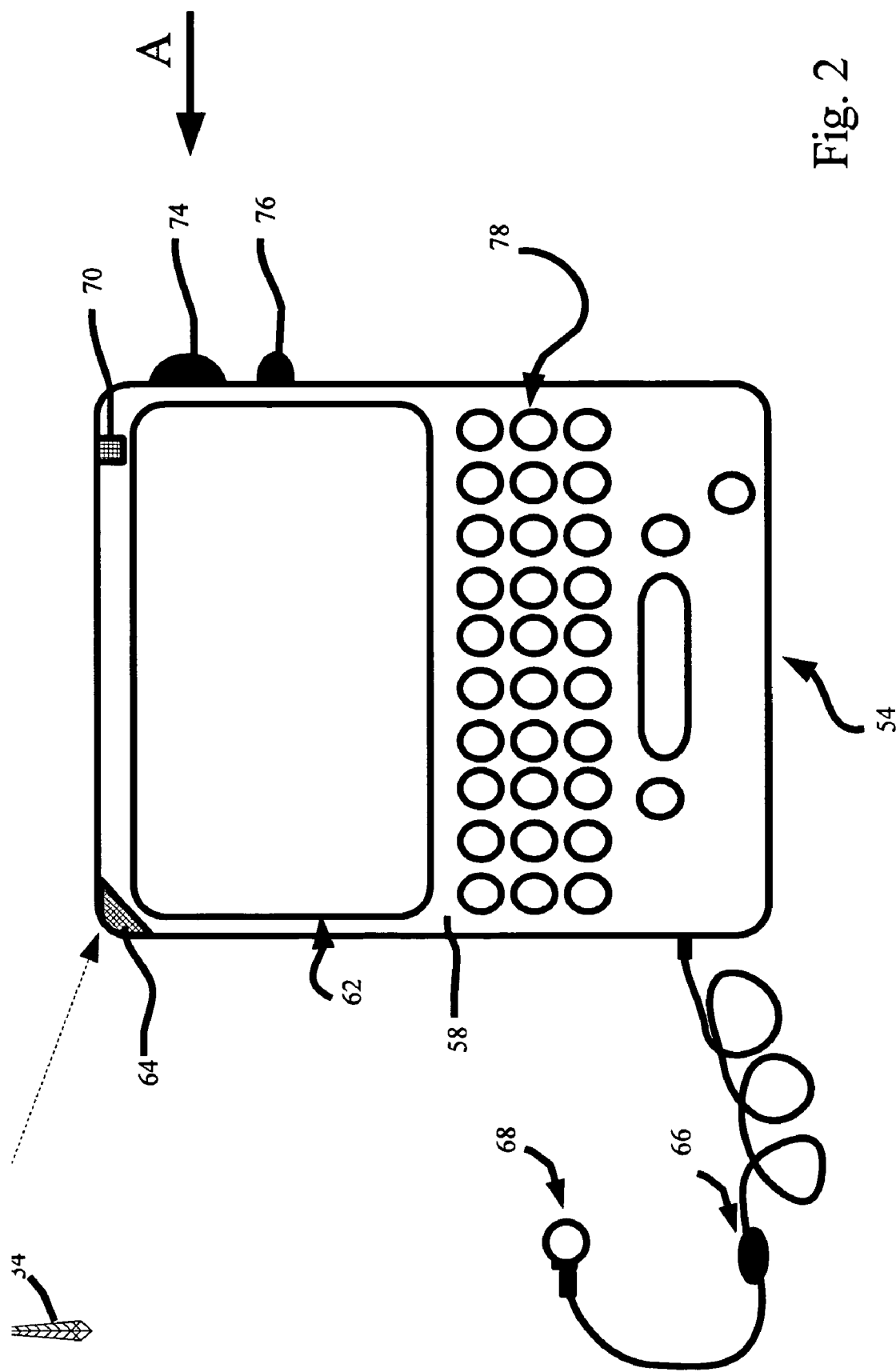
FIG. 2 is a schematic representation of an electronic device in accordance with an embodiment of the invention.

Referring now to FIG. 2, device 54 is shown in detail. In the present embodiment, device 54 is based on the computing environment and functionality of an enhanced personal digital assistant with voice telephony capabilities. However, it is to be understood that electronic device 54 can be based on the construction and functionality of any mobile electronic device that can be connected to a wireless network. Such devices include cellular telephones or laptops computers connected to wireless networks. In a present embodiment, electronic device 54 includes, a housing 58, which frames an LCD display 62, a speaker 64, a telephone headset comprising an ear bud 66 and a microphone 68, an LED indicator 70, a trackwheel 74, an exit key 76 and a keyboard 78. Trackwheel 74 and exit key 76 can be inwardly depressed along the path of arrow "A" as a means to provide additional user-input. It will be understood that housing 58, can be made from any suitable material as will occur to those of skill in the art.

Figure 3:
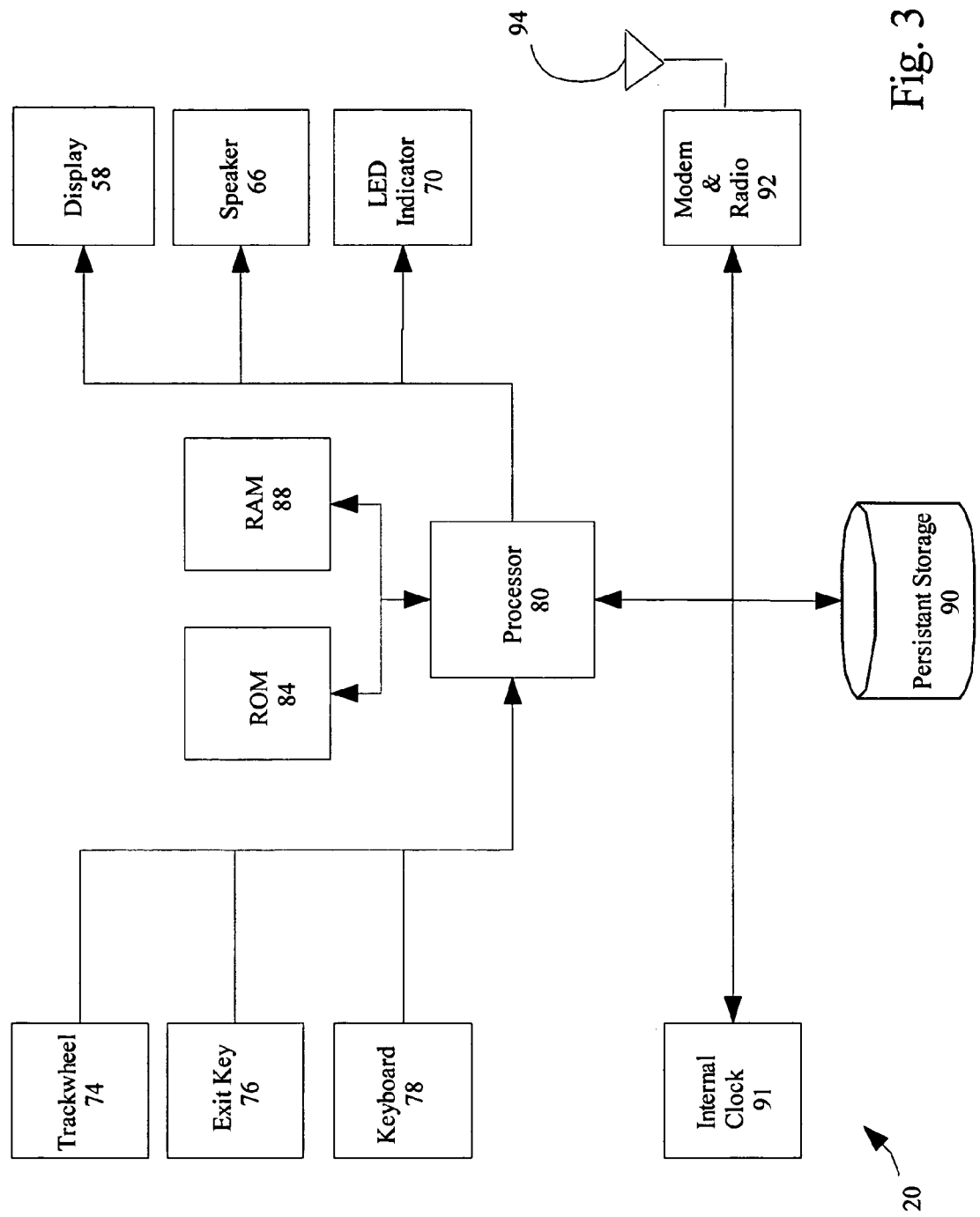
FIG. 3 is a block diagram of certain internal components within the device in FIG. 2.

Referring now to FIG. 3, a block diagram of certain internal components within device 54 are shown. Device 54 is based on a microcomputer that includes a processor 80. Processor 80 is connected to a read-only-memory ("ROM") 84, which contains a plurality of applications executable by processor 80 that enables device 54 to perform certain functions. Processor 80 is also connected to a random access memory unit ("RAM") 88 and a persistent storage device 90, which are responsible for various nonvolatile storage functions of device 54. Processor 80 can send output signals to various output devices including display 58, speaker 66 and LED indicator 70. Processor 80, can also receive input from various input devices including trackwheel 74, exit key 76 and keyboard 78. Processor 80 is also connected to an internal clock 91 and a modem and radio 92. Modem and radio 92 are operable to connect device 54 to various base stations 34. The specific base stations 34 that modem and radio 92 connect to will depend on the location of device 54. For example, as discussed above, each time device 54 is located within geographic range 38, modem and radio 92 connect to network 30 through base stations $34_1$ and $34_2$ and each time device 54 is located within geographic range 46, modem and radio 92 connect to network 30 through base stations $34_3$ and $34_4$.

Device 54 is operable to execute various system applications stored on ROM 84. One specific system application on device 54 is a location manager application, not shown. Location manager application is an application that keeps a list of specific base stations 34 with which device 54 is able to connect. Table I, is an example of the type of list that can be generated and stored by the location manager application and which is updated each time a unique set of base stations becomes available to device 54.

TABLE I

Location Manager

| Index | Location | ID Set | Current Location (Y or N) |
|---|---|---|---|
| 1. | Location #1 | $ID_1 + ID_2$ | Y |

As illustrated in Table I, each time a new set of base stations 34 (which can be one or more base stations 34) becomes available to device 54, a new row is created. The first column, entitled "Location", describes a generic name, automatically assigned by the location manager application, for the location that corresponds to the new set of base stations. Such generic names, in the present embodiment, have no geographic significance and are merely names associated with the set of base stations in the second column. The second column, entitled "ID Set", describes specific ID's associated with such base stations. The third column, entitled "Current Location", indicates the current location of device 54 by having a "Y" inserted in the row that corresponds to the present location of device 54. Those of skill in the art will recognize that Table I corresponds to the behavior of the location manager application when device 54 is in geographic range 38, as shown in FIG. 1.

A method reflecting the operation of the location manager application in accordance with another embodiment of the invention will now be discussed with reference to the flowchart shown in FIG. 4, and is indicated generally at 300. In order to assist in the explanation of method 300, reference will be made to the foregoing discussion of system 30 and device 54. In order to further assist in the explanation of method 300, the sequence of steps in method 300 shall be followed in connection with a couple of examples using system 30 and device 54. In these examples, it will be assumed that device 54 will be moving through a series of geographic ranges within system 30.

Figure 4:
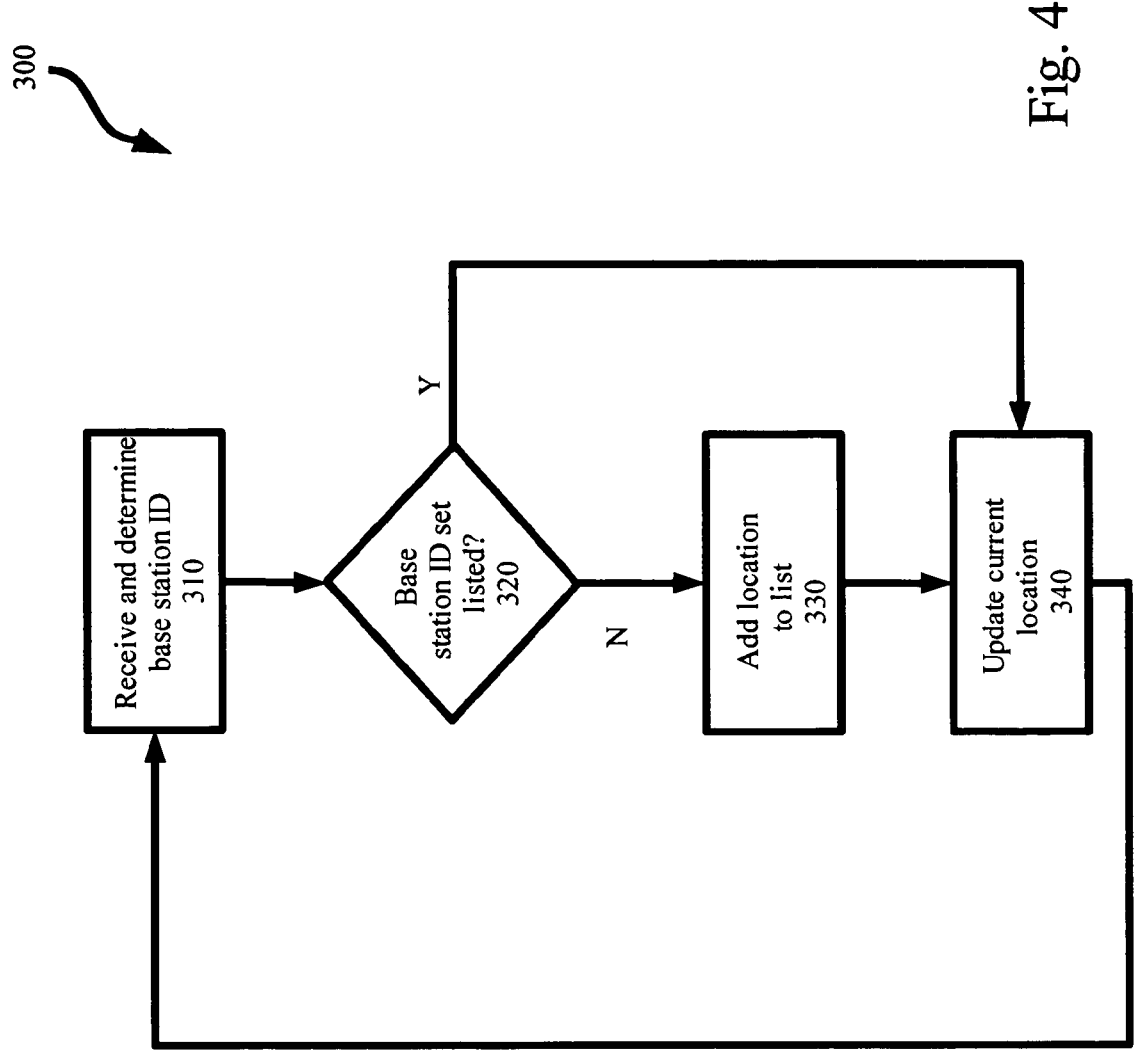
FIG. 4 shows a flow chart depicting a method for the operation of the location manager application.

As demonstrated in the flowchart in FIG. 4, device 54 is constantly determining available base stations corresponding to device 54's geographic location. For the sake of an example, we will assume that device 54 is located in location 38, as shown in FIG. 1. At step 310, device 54 receives ID's from available base stations corresponding to device 54's geographical location. In the present example, device 54 receives $ID_1$ and $ID_2$ from base stations $34_1$ and $34_2$ corresponding to geographic location 38. The method then proceeds to step 320, where device 54 determines whether the ID set received is already present in Table I. In the case of the present example, the ID set is already present in Table I. Referring now to the flowchart in FIG. 4, the method proceeds to step 340, where the current location of device 54 is updated. In the case of the present example this means inserting a "Y" in the row corresponding to Location #1. Since this is already the case in Table I, the method goes back to step 310 and method 300 begins again. If on the other hand, the ID set was not present in Table I, device 54 would proceed to step 330, where the combination would be recorded as an additional generic location.

To further illustrate method 300, let us assume that device 54 is moved into geographic region 46 for the first time. In this example, method 300 proceeds through step 310 to receive $ID_3$ and $ID_4$ and proceeds through step 320 to determine that the $ID_3$ and $ID_4$ set is not present in Table I. Referring now to the flowchart in FIG. 4, the method proceeds to step 330 and, as shown in Table II, the set comprised of $ID_3$ and $ID_4$ is added to the original information in Table I. At this point the method proceeds to step 340 where the current location gets updated in Table I by having the "Y" inserted in the row corresponding to Location #2 and having an "N" inserted in all other rows. The method then returns to step 310 where method 300 begins.

TABLE II

Location Manager
(Updated from Table I using location manager)

| Index | Location | ID List | Current Location (Y or N) |
|---|---|---|---|
| 1. | Location #1 | $ID_1 + ID_2$ | N |
| 2. | Location #2 | $ID_3 + ID_4$ | Y |

Figure 5:
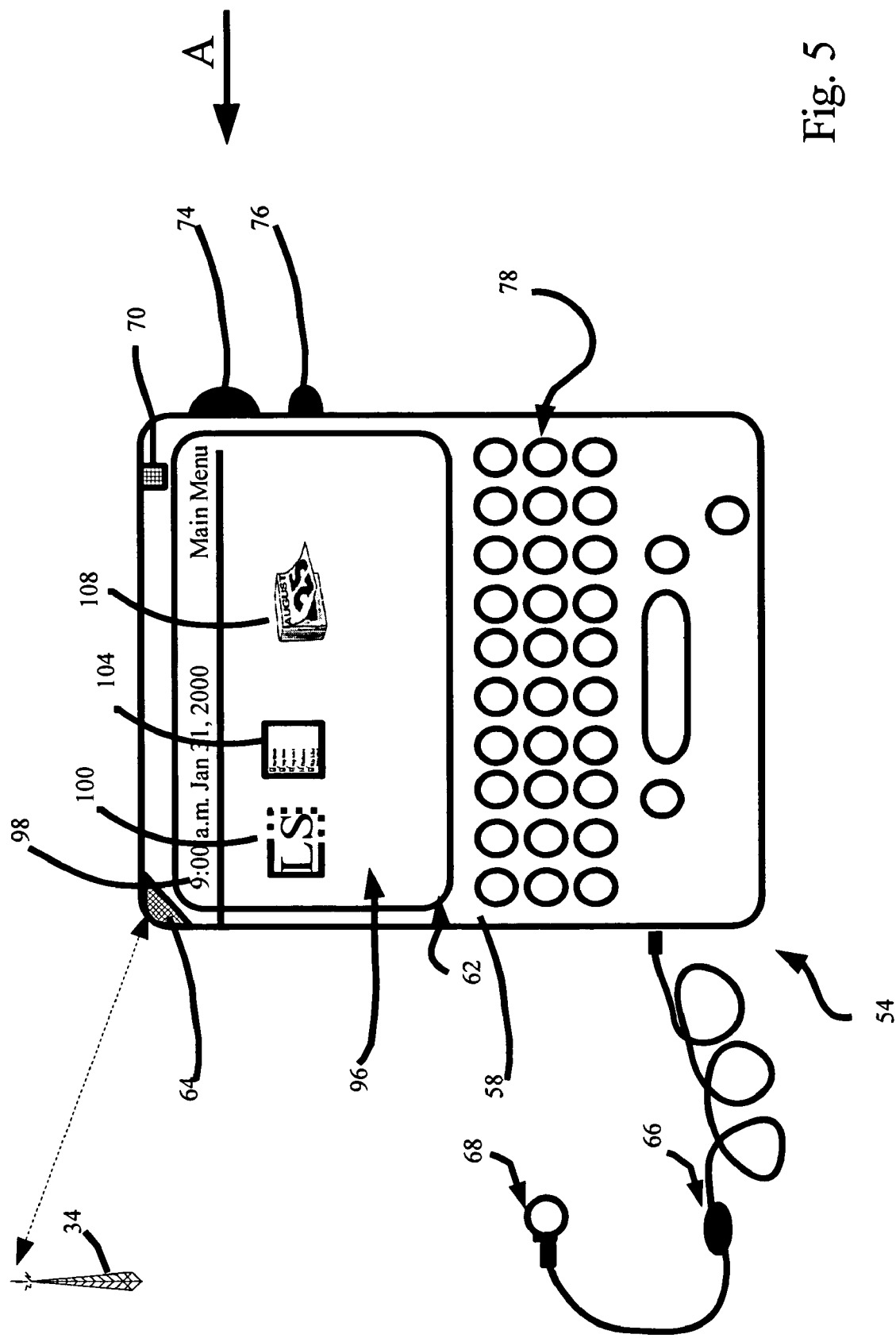
FIG. 5 shows the device of FIG. 2 with the main menu screen displaying a plurality of applications including location setup, task manager and calendar.

Device 54 is, also, operable to execute various user applications stored on ROM 84. Referring now to FIG. 5, device 54 is shown with a main menu screen 96, that displays a system clock 98, which is updated according to internal clock 91. Main menu screen 96 also displays a plurality of applications that are executable on processor 80. In a present embodiment, such displayed applications include a location setup 100, a task manager 104 and a calendar 108. When executed on processor 80, these applications cause device 54 to operate in various ways, as will be discussed further below. Trackwheel 74 can be used to scroll through the applications and to select a desired application by pressing inwardly, along the path of arrow A, on trackwheel 74. Exit key 76 can be used to exit any application by pressing inwardly, along the path of arrow A, on exit key 76.

Figure 6:
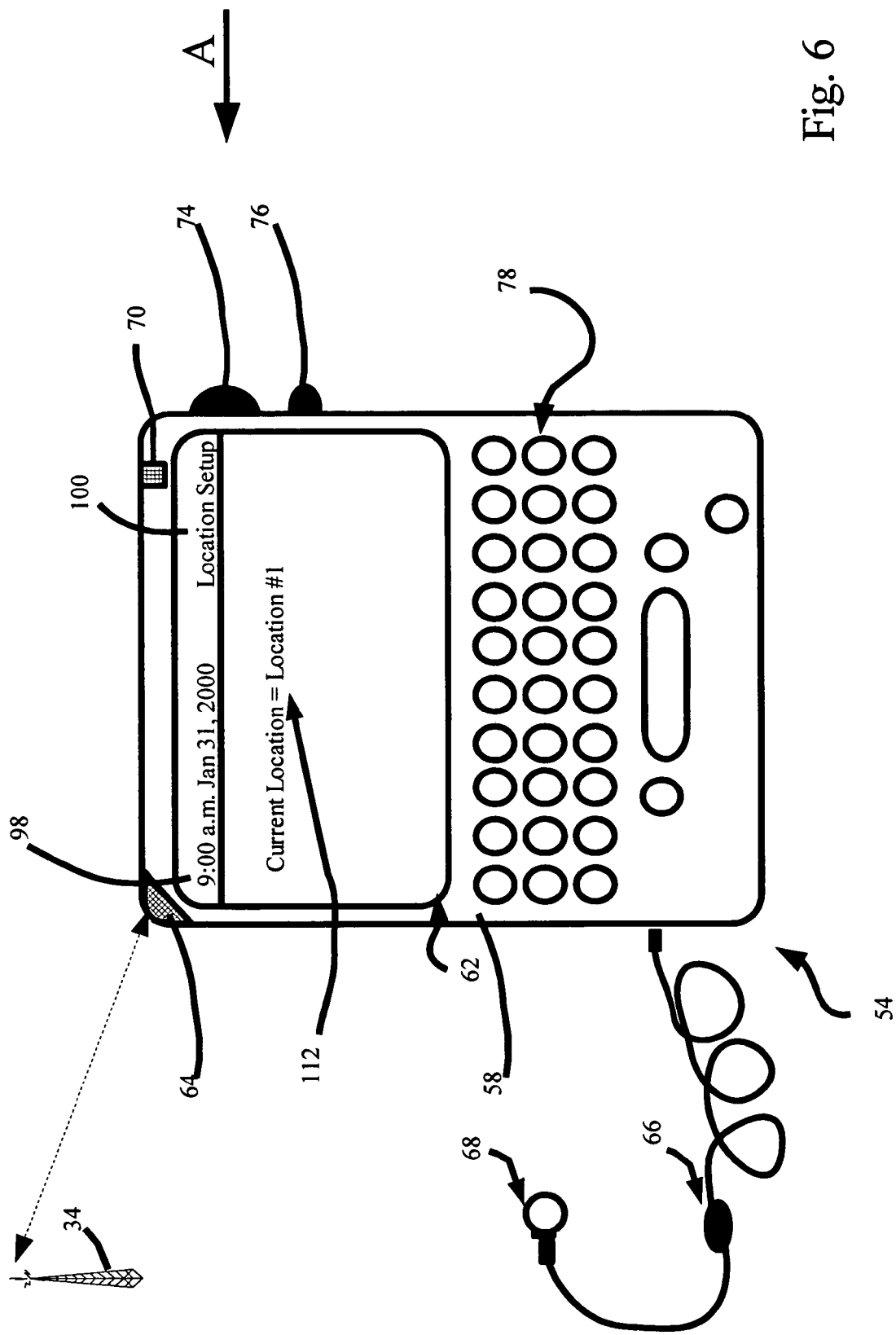
FIG. 6 shows the device of FIG. 2 with the location setup application displaying the location of the device, referred to as Location #1.
Figure 7:
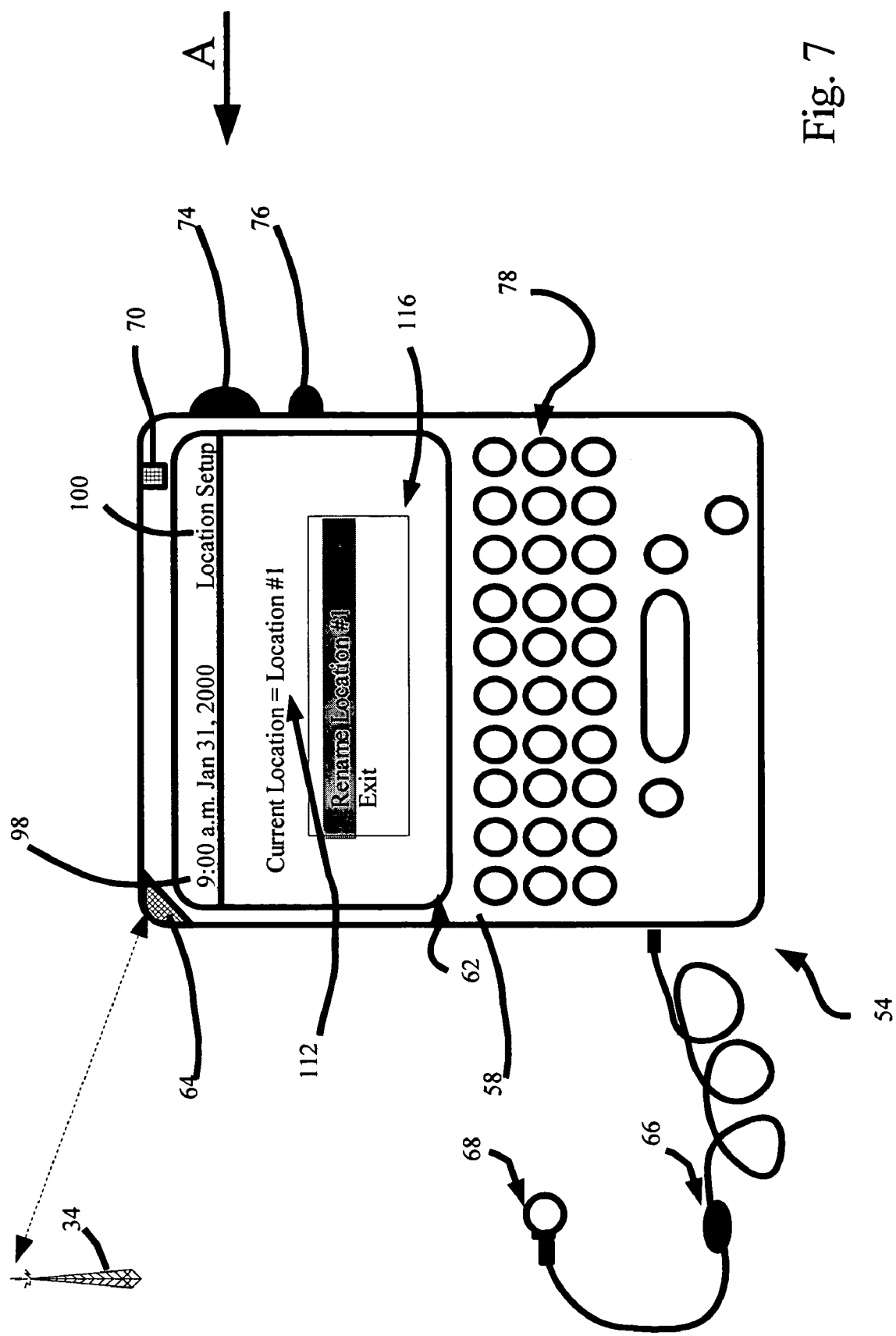
FIG. 7 shows the device of FIG. 2 with the location setup application displaying a menu, in which the user has chosen to rename the location of Location #1.
Figure 8:
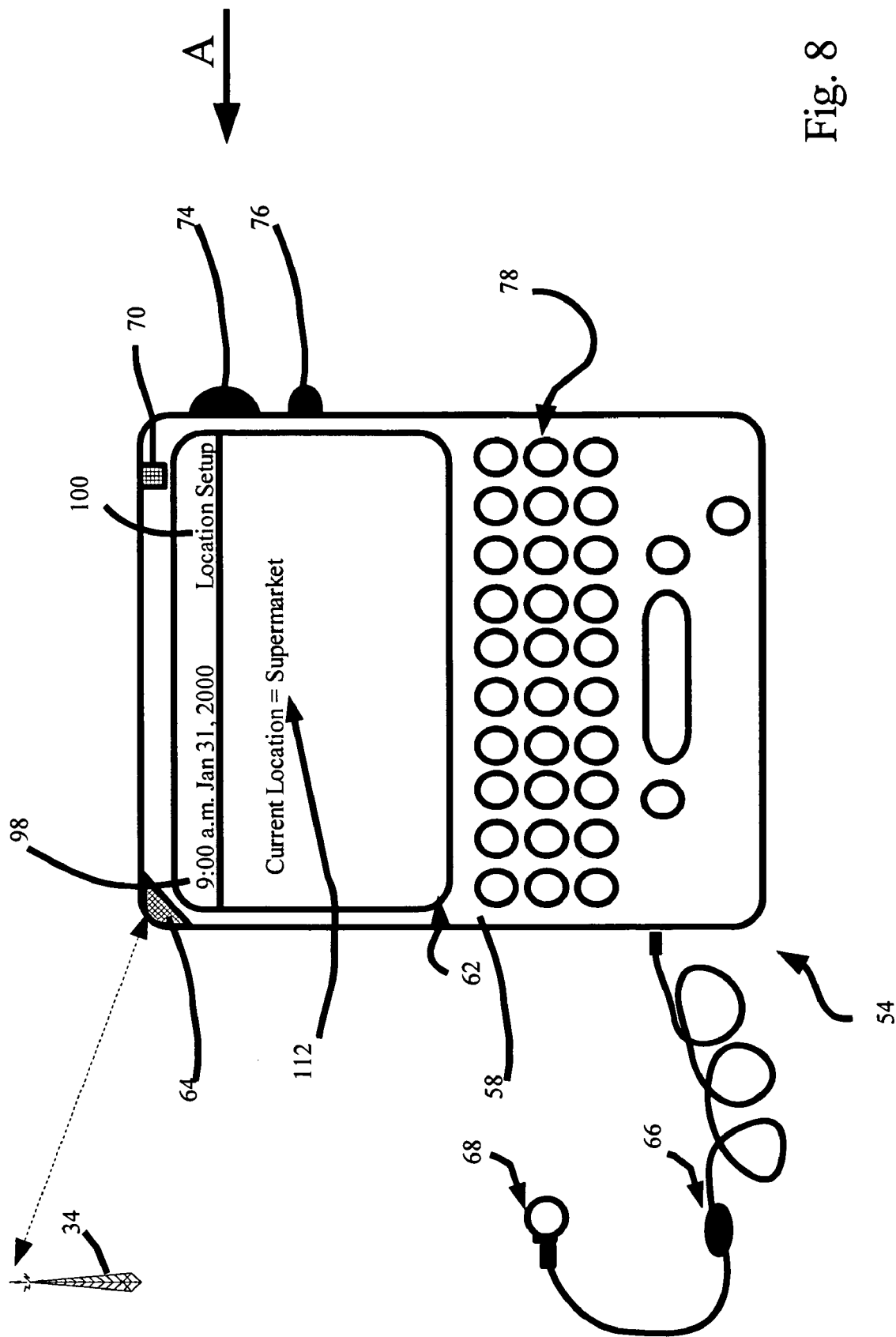
FIG. 8 shows the device of FIG. 2 with the location setup application displaying the location of the device having been renamed "Supermarket"

Referring now to FIG. 6, device 54 is shown displaying a location designation 112 corresponding to the location of device 54, using the application called location setup 100. In FIG. 6, it is shown that the "Current Location" (of device 54) is "Location #1", which, for the purposes of the present embodiment, corresponds to Location #1 on Tables I and II, indicating that device 54 is in geographic range 38 as shown in FIG. 1. Referring now to FIG. 7, using menu 116, the user is given the option to "Rename Location #1" or to "Exit" by highlighting one of the choices and depressing trackwheel 74 along the path of arrow A. If the user chooses to rename location designation 112, the user is given access to a dialogue box and allowed to rename the generic location with any name the user prefers. For the purposes of the present example, and referring now to FIG. 8, the user replaces the generic name "Location #1" with "Supermarket", indicating that geographic region 38 will now be referred to as "Supermarket". Accordingly, Table II in the location manager application can now be updated to replace "Location #1" with "Supermarket", as shown in Table III.

TABLE III

Location Manager
(Updated from Table II using location setup)

| Index | Location | ID List | Current Location (Y or N) |
|---|---|---|---|
| 1. | Supermarket | $ID_1 + ID_2$ | Y |
| 2. | Location #2 | $ID_3 + ID_4$ | N |

A method in connection with the operation of location setup 100 in accordance with another embodiment of the invention will now be discussed with reference to the flowchart shown in FIG. 9 and is indicated generally at 400.

In order to assist in the explanation of method 400, reference will be made to the foregoing discussion of system 30 and device 54. In order to further assist in the explanation of method 400, the sequence of steps in method 400 shall be followed in connection with an example using system 30 and device 54. For the sake of the example in the present embodiment, it will be assumed that device 54 has now moved to geographic range 46.

Figure 9:
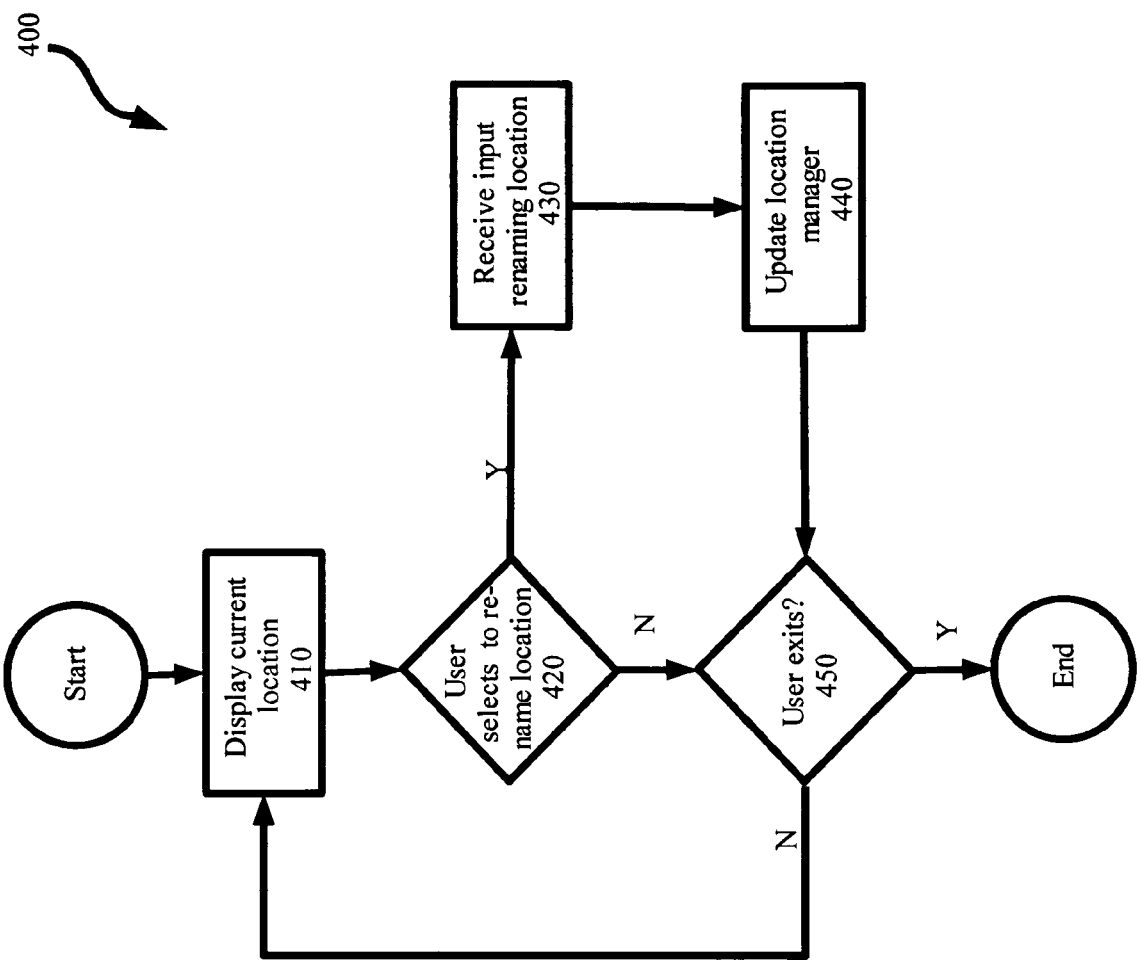
FIG. 9 shows a flow chart depicting a method for the operation of the location setup application.
Figure 10:
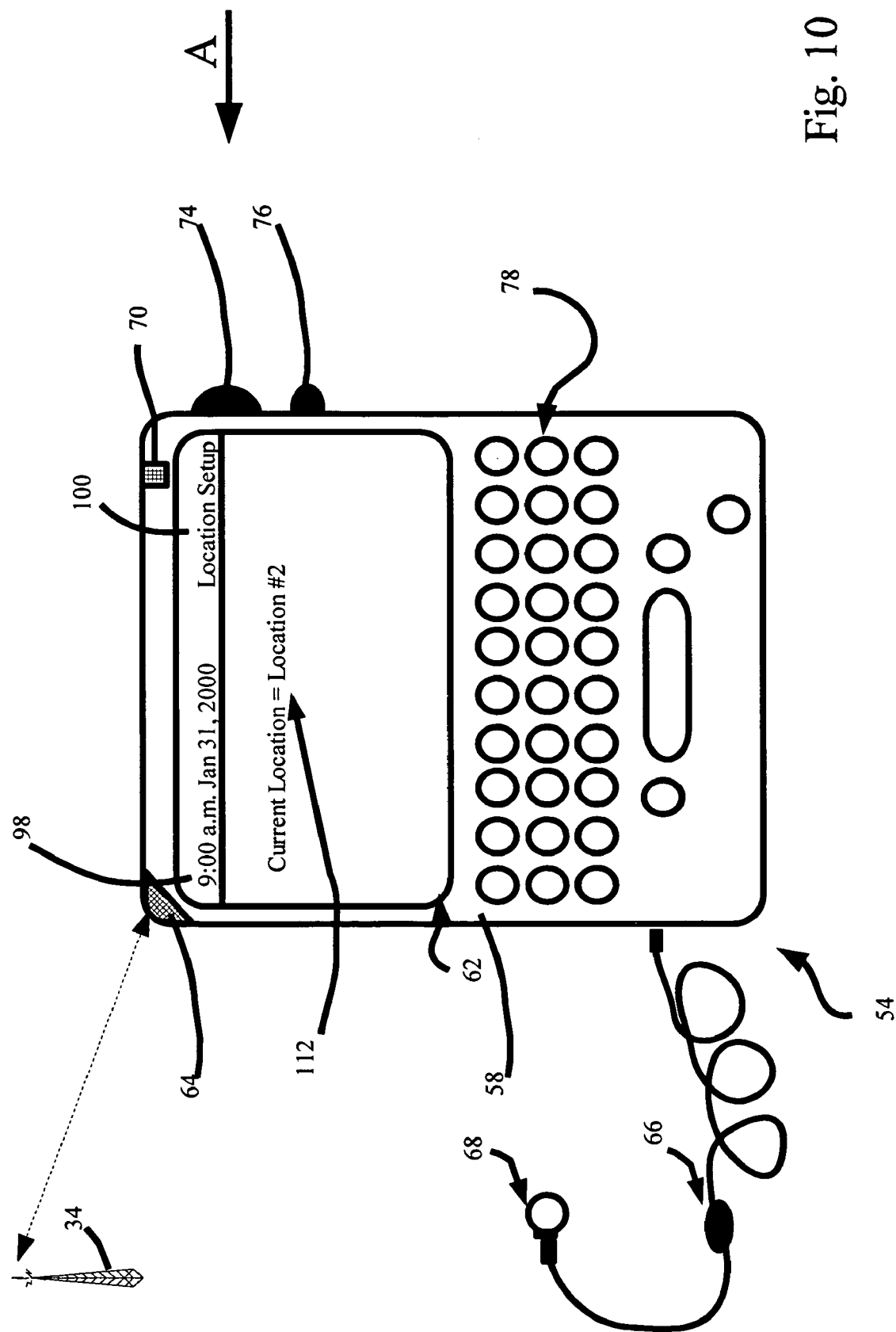
FIG. 10 shows the device of FIG. 2 with the location setup application displaying the location of the device, referred to as "Location #2"
Figure 11:
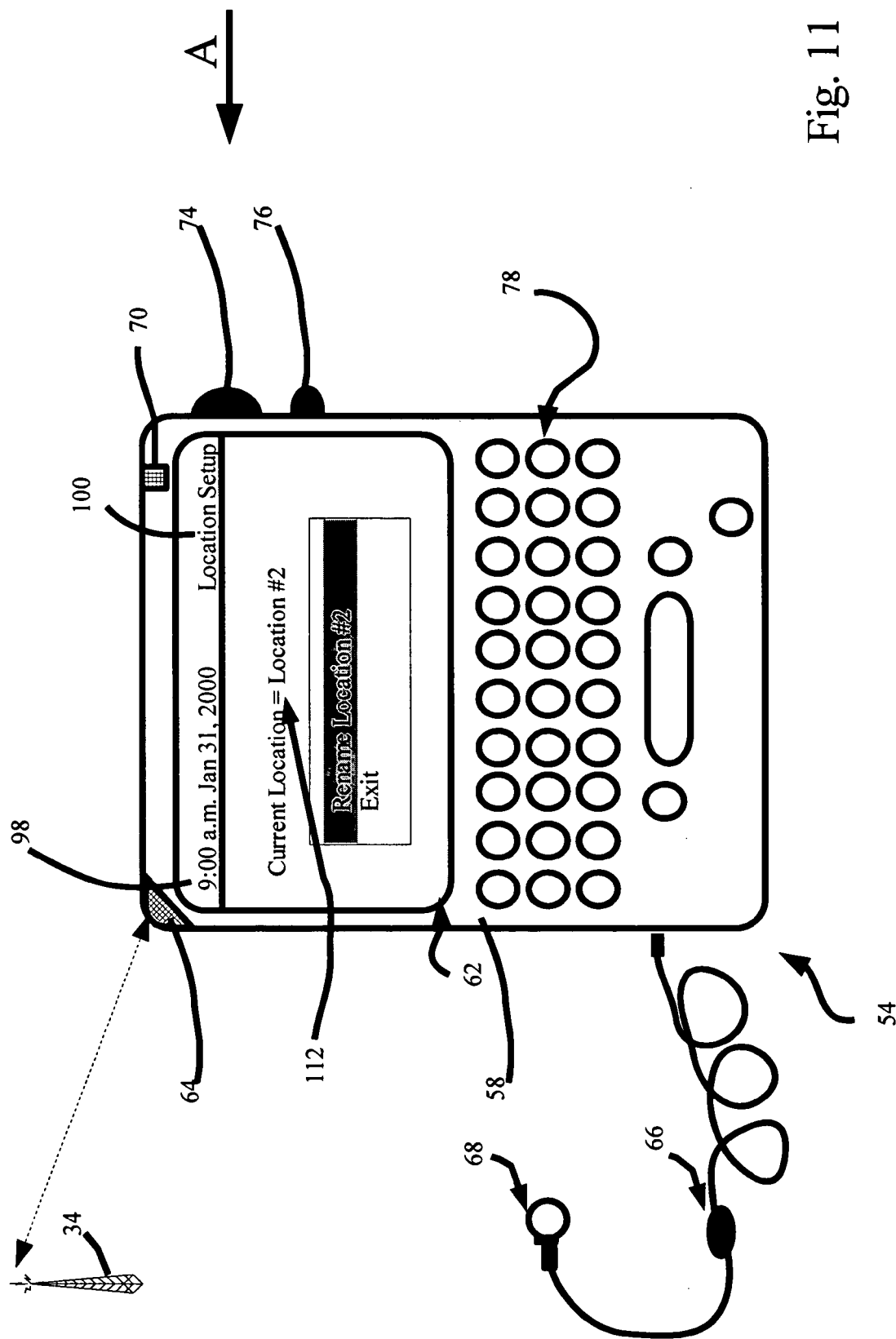
FIG. 11 the device of FIG. 2 with the location setup application displaying a menu, in which the user has chosen to rename the location of Location #2.

Referring now to the flowchart in FIG. 9, at step 410, location setup 100 displays the current location of device 54 (i.e. location designation 112). In the present example, as demonstrated in Table II and shown in FIG. 10, location designation 112 for geographic range 46 is Location #2. The method then proceeds to step 420, where it is determined whether the user selects to re-name the location specified. If the user selects to rename the location specified, the method proceeds to step 430 where device 54 receives input renaming location designation 112. On the other hand, if the user decides not to rename location designation 112, the method proceeds to step 450, where the user selects whether to exit location setup 100. In the present example, and referring now to FIG. 11, let us assume that the user decides to rename location designation 112, and the method, hence, proceeds to step 430. At step 430, device 54 receives input from the user to rename location designation 112. In the present example, let us assume that the user renames location designation 112 "Office". The method then proceeds to step 440, where the location manager application is updated. In the present example, and as demonstrated in Table IV, location manager gets updated to replace "Location #2" with the word "Office".

TABLE IV

Location Manager
(Updated from Table III using location setup)

| Index | Location | ID List | Current Location (Y or N) |
|---|---|---|---|
| 1. | Supermarket | $ID_1 + ID_2$ | N |
| 2. | Office | $ID_3 + ID_4$ | Y |

Figure 12:
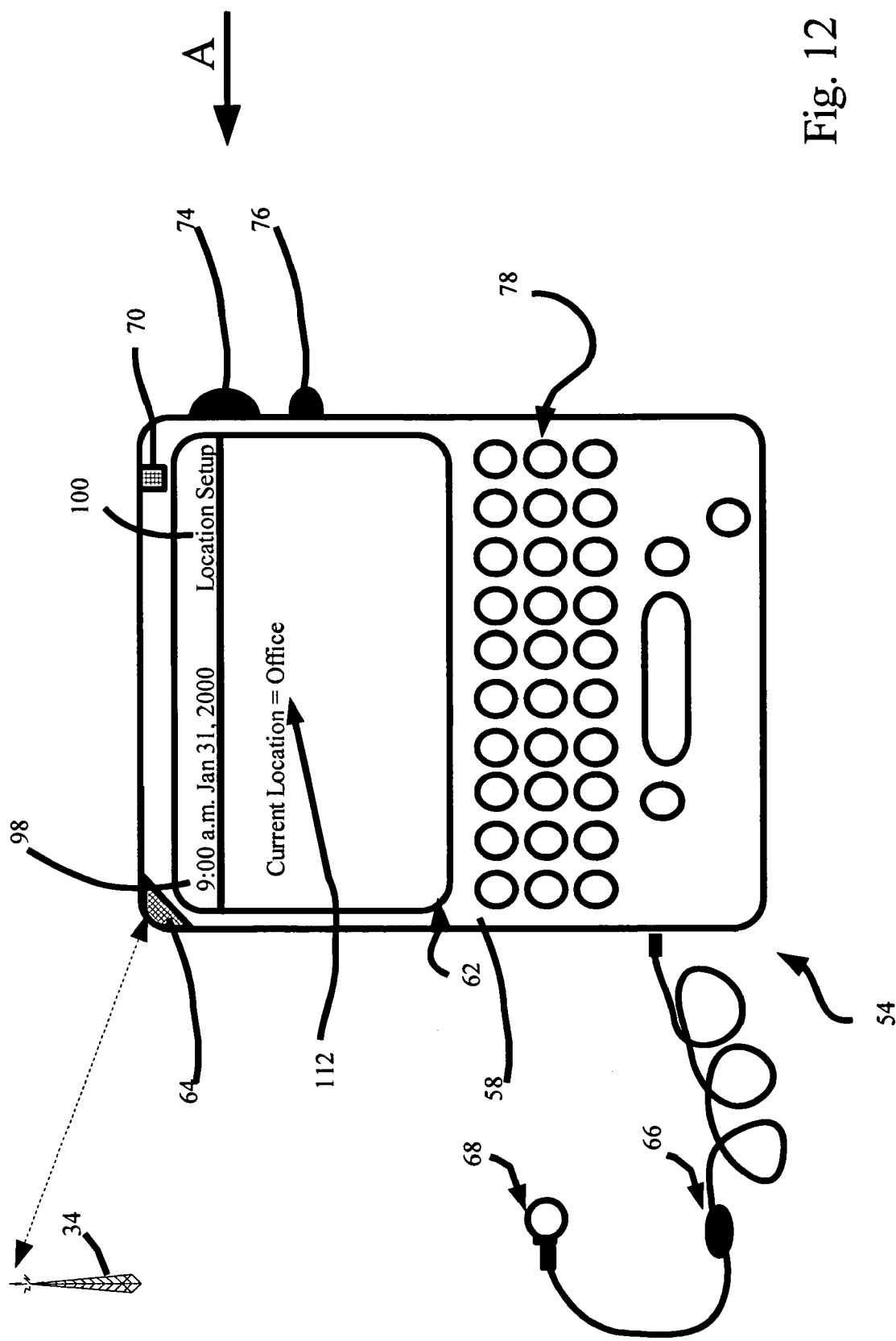
FIG. 12 shows the device of FIG. 2 with the location setup application displaying the location of the device having been renamed "Office"

The method then proceeds to step 450 where the user is given the option to exit location setup 100. If the user chooses to exit, the method ends. However, if the user chooses not to exit, the method returns to step 410 and the method starts again. In the present example, let us assume the user chooses not to exit location manager. The method, thus, proceeds back to step 410 and, referring now to FIG. 12, location setup 100 displays the location of device 54, which has now been renamed "Office". As described before, the method then proceeds to step 420 where the user selects whether to re-name the location. In the present example, let us assume that the user chooses not to rename location designation and thus proceeds to step 450, where this time, the user chooses to exit location setup 100.

Figure 13:
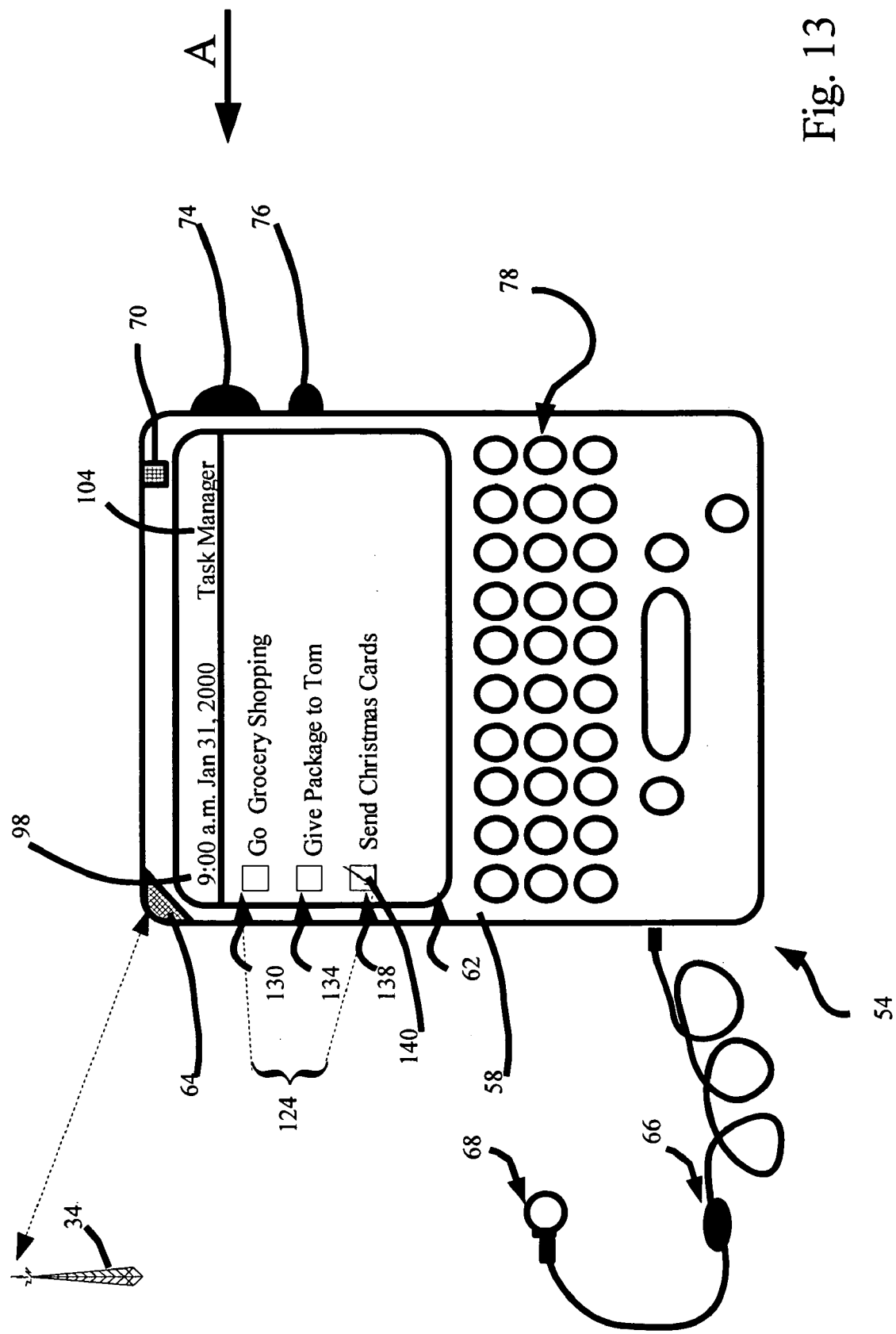
FIG. 13 shows the device of FIG. 2 with the task manager application displaying a plurality of tasks.

Referring now to FIG. 13, device 54 is shown displaying a set of exemplary tasks 124, using the application called task manager 104. As will be apparent to those skilled in the art, trackwheel 74 can be used to scroll through individual tasks, to select a particular task 124, using methods known to those skilled in the art. In the example in FIG. 13, tasks 124 consist of a first task 130, which reminds the user to go grocery shopping, a second task 134, which reminds the user to give a package to Tom, and a third task 138, which reminds the user to send Christmas cards. To the left of task 138, there is a checkmark 140, indicating that task 138, sending Christmas cards, is completed.

Figure 14:
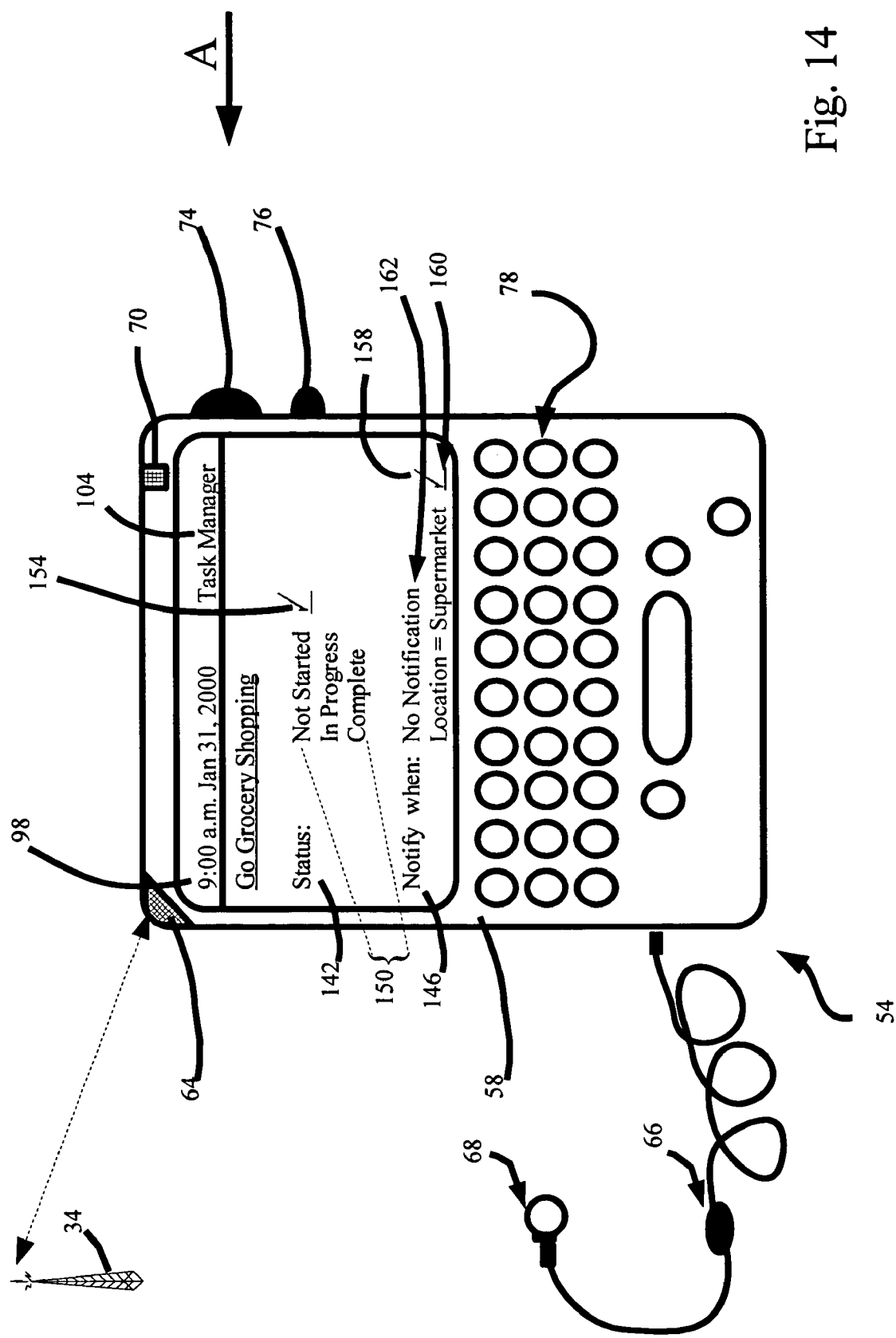
FIG. 14 shows the device of FIG. 2 with the task manager application displaying the particulars of the called "Go Grocery Shopping"

Referring now to FIG. 14, device 54 is shown displaying the particulars of task 130. In the present embodiment, these particulars are "Status" 142, and "Notify When" 146. "Status" 142, describes the present status of the task. In the present embodiment, status 142 of a task can be one of status options 150, consisting of "Not Started", "In Progress", or "Completed". It will now be apparent that "Not Started" means the user has not started the task, "In Progress" means the user has started the task but has not completed the task yet, and "Complete" means that the user has finished performing the task. A specific status option 150 is chosen by having checkmark 154 moved beside the chosen status option using trackwheel 74 and methods known to those skilled in the art. In the example in FIG. 14, the user has not started task 130, to "Go Grocery Shopping", yet.

"Notify When" 146, in FIG. 14, describes circumstances in which device 54 notifies or reminds the user of the need to perform the task, by for example, having light emanate from LED indicator 70 or having sound emanate from speaker 64. In the present embodiment, one of these circumstances is defined by Location description 160. Location description 160 can be set to any location identified by location manager 100. In the present example, the Location description 160 is equal to "Supermarket", which according to the foregoing, corresponds to geographic location 38. Similar to checkmark 154, checkmark 158 can be placed beside "No Notification" 162, indicating that the user will not be notified to perform the task. As in the case of FIG. 14, it can also be placed beside Location description 160, indicating that the user will be notified to go grocery shopping whenever the device is in geographic range 38, (previously renamed "Supermarket" by location setup 104).

A method for notification based on location, in accordance with another embodiment of the invention, will now be discussed with reference to the flowchart shown in FIG. 15 and is indicated generally at 500. In order to assist in the explanation of method 500, reference will be made to the foregoing discussion of system 30 and device 54. In order to further assist in the explanation of method 500, the sequence of steps in method 500 shall be followed in connection with an example using system 30 and device 54. For the sake of the example in the present embodiment, it will be assumed that device 54 moves from geographic range 46 to geographic range 38.

Figure 15:
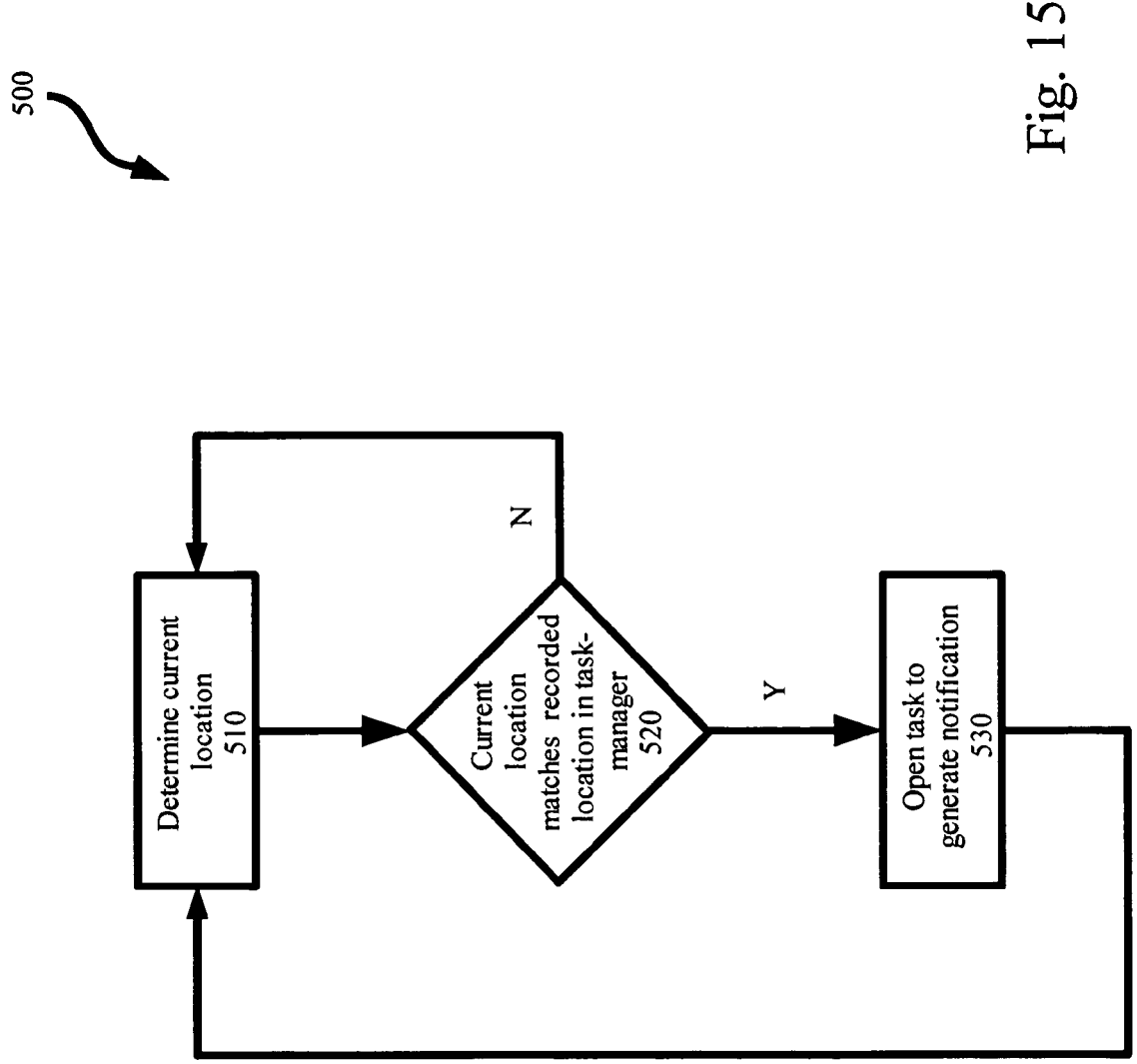
FIG. 15 shows a flow chart depicting a method for notification based on location; and, FIG. 16 shows the device of FIG. 2 notifying the user of the device to "Go Grocery Shopping".

Referring now to the flowchart in FIG. 15, at step 510, the location manager application determines the current location of device 54, using for example, method 300 (in combination with method 400 as appropriate), described previously. In the present example, when device 54 is in geographic range 46, it receives $ID_3$ and $ID_4$ and determines that the current location of device 54 is within the range called "Office" in Table IV. Method 500 then proceeds to step 520, where device 54 determines whether the current location matches Location description 160 in any of tasks 124 in task manager 104. If the current location matches Location description 160 in any of tasks 124, the method proceeds to step 530, where the task containing the matched Location description is opened and device 54 generates a notification signal notifying the user of that particular task. If, on the other hand, the current location does not match any Location description 160 of tasks 124, the method proceeds to step 510, where the method starts all over again. In the present example, the current location, Office, does not match Location description 160 in FIG. 14. Let us assume that, it similarly does not match the Location descriptions 160 of tasks 134 and 138 in FIG. 13.

Figure 16:
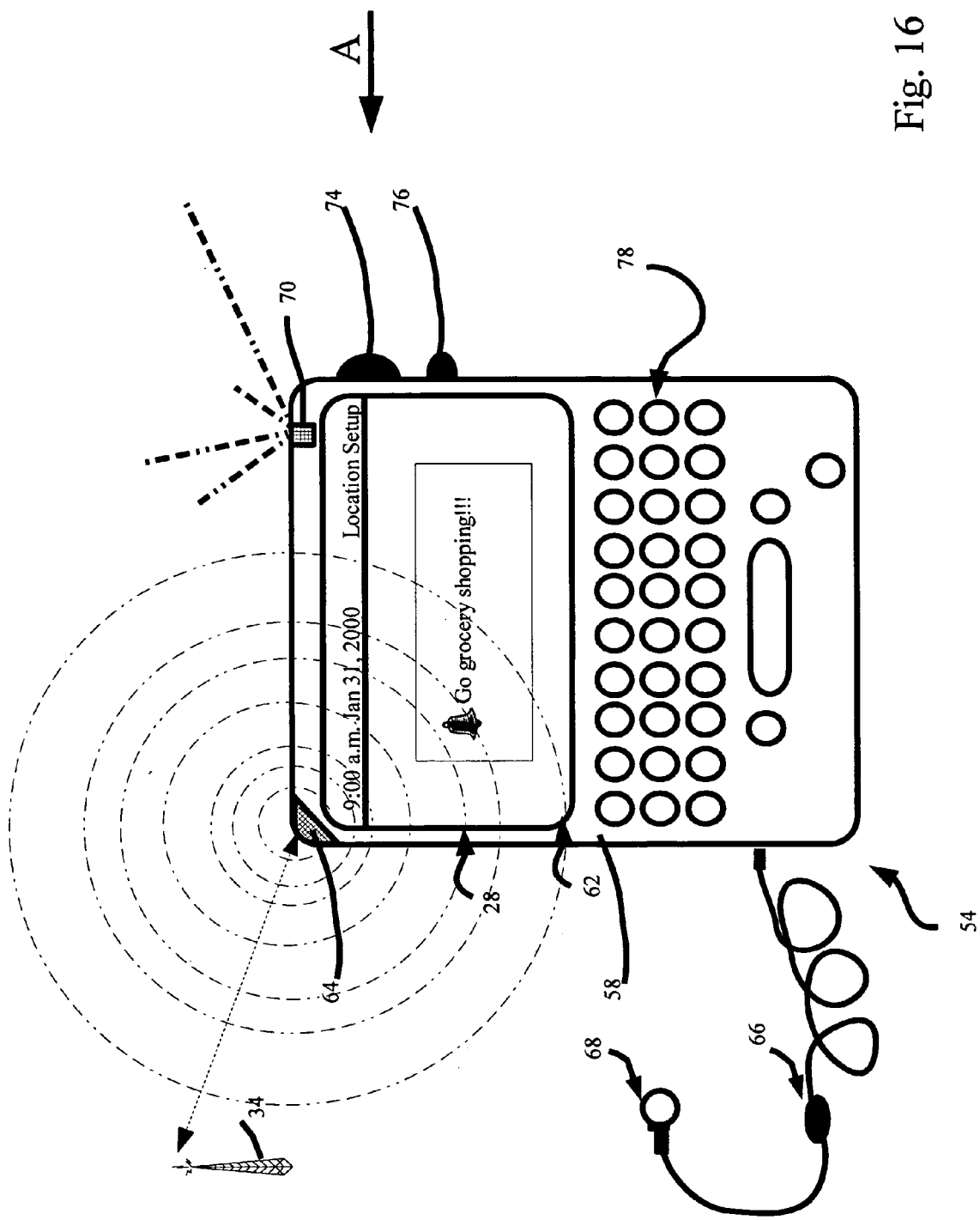

The method, thus, returns to step 510, where method 500 begins again, where device 54 determines the current location of device 54 once again. By this time, let us assume that the user of device 54 has moved from geographic range 46 to geographic range 38. In determining the current location of device 54, this time, device 54 receives $ID_1$ and $ID_2$ and determines that the current location of device 54 is within the range called "Supermarket" in Table IV. The method then proceeds to step 520 where it is determined that this time, the current location, Supermarket, matches Location description 160 in task 130. The method, thus, proceeds to step 530, where, referring now to FIG. 16, task 130 gets opened and device 54 notifies the user to go grocery shopping by having light emanate from LED indicator 70 and sound emanate from speaker 64. At this point, the method proceeds back to step 510 and the method begins all over again.

While the embodiments discussed herein are directed to specific implementations of the invention, it will be understood that subsets, combinations and variations of the embodiments are within the scope of the invention. For example, the embodiment can be modified to have as little as just one base station covering just one geographic area or it can be modified to have as many different base station sets as desired, covering as many geographic ranges.

The embodiment discussed, can also be modified to be used with a variety of functions such as the calendar function, where the location of an appointment can be entered when setting up the appointment. In these circumstances, the device would process the location of the appointment, check it against the current location of the device and remind the user to allow for appropriate "travel time" in order to make the appointment. Such functions can be as simple as detecting whether the location of the appointment is different than the location of the device and warning the user of the upcoming appointment thirty minutes ahead of time to allow for travel time, or as complicated as determining how much travel time is needed (either based on predefined travel time limits or based on the device's own travel time estimate) and warning the user accordingly.

Furthermore, a device can be configured to behave differently when it is located in different geographical locations. For example, a device can be configured not to notify the user of an incoming call or message when the device is in certain geographic locations, or to notify the user using a different mode of notification when the user is in a specific geographic location. A device can be configured not to ring when the person is in the Office (or the geographic range that includes the Office) or it can be configured to vibrate when the device is at home (or the geographic range that includes the person's home. Other examples of having the device behave differently based on its geographic location include, having the device send an automated message (voice or email) when it enters a certain geographic location to, for example, tell Mom that the user has arrived, or to have all calls forwarded to an answering machine when the user leaves a certain neighborhood.

Furthermore it should be understood that, in other embodiments, one set of base stations may be associated with more than one location. ie. Geographic region 38 could be associated with not only the supermarket, but also the gymnasium or the bank and any other location physically located within that geographic region. Applications would be able to use any of these location markers to trigger actions as the location events come and go.

It is also contemplated that notification methods used to notify the user of various reminders, related to the location of the device, are not limited to light emanating from an LED indicator or sound emanating from a speaker. Notification methods can consist of a variety of audible, inaudible or mechanical modes of notification, such as various sounds, tunes, flashings of light or vibrational modes and/or combinations thereof, which are familiar to those skilled in the art.

The invention claimed is:

1. A wireless communication system comprising:
a first base station set operable to wirelessly transmit across a first geographic range;
a second base station set operable to wirelessly transmit across a second geographic range;
a subscriber device operable to wirelessly receive a first identifier from said first base station set when said device is in said first geographic range and to receive a second identifier from said second base station set when said device is in said second geographic range; and
said device operable to store a location that is associated with each said identifier, said device further operable to maintain a first event associated with said first geographic range, such that when said device is in said second geographic range a second event is performed based on a relationship between said second geographic range and said first geographic range, and such that when said device is in said second geographic range a reminder is generated for said appointment at a time prior to said appointment, said time being substantially equal to an expected travel time from said second geographic range to said first geographic range.

2. The wireless communication system of claim 1, wherein said subscriber device is selected from the group consisting of a cell phone, a smart telephone and a laptop computer connected to a wireless network.

3. The wireless communication system of claim 1, wherein at least one of said first base station set and said second base station set comprises only one base station.

4. The wireless communication system of claim 1, wherein said system includes at least one additional base station set operable to wirelessly transmit across an additional geographic range respective thereto; said subscriber device operable to wirelessly receive an additional identifier from said at least one additional base station set when said device is in said additional geographic range; said device operable to store a user-defined location that is associated with each said additional identifier; said device further operable when said device is in said additional geographic range, to perform said second event based on a relationship between said additional geographic range and said first geographic range.

5. The wireless communication system of claim 1, wherein said device is operable to store at least one additional location that is associated with each said identifier.

6. The wireless communication system of claim 1, wherein said location is user-defined.

7. The wireless communication system of claim 1 wherein said device is further operable to perform said second event in advance of a timing of said first event.

8. The wireless communication system of claim 1 wherein said second event includes a warning of an upcoming appointment to a user.

9. The wireless communication system of claim 1 wherein said second event includes issuing a travel time estimate to a user.

10. A wireless subscriber device for use in a wireless system having a first base station set operable to wirelessly transmit across a first geographic range and a second base station set operable to wirelessly transmit across a second geographic range, said device comprising:
  a microcomputer operable to wirelessly receive a first identifier from said first base station set when said device is in said first geographic range and to receive a second identifier from said second base station set when said device is in said second geographic range; and
  said microcomputer operable to store a location that is associated with each said identifier, said microcomputer further operable to maintain a first event associated with said first geographic range, such that when said device is in said second geographic range, a second event is performed based on a relationship between said second geographic range and said first geographic range, and such that when said device is in said second geographic range a reminder is generated for said appointment at a time prior to said appointment, said time being substantially equal to an expected travel time from said second geographic range to said first geographic range.

11. The wireless subscriber device of claim 10, wherein said subscriber device is selected from the group consisting of a cell phone, a smart telephone and a laptop computer connected to a wireless network.

12. The wireless subscriber device of claim 10 wherein said location is user-defined.

13. The wireless subscriber device of claim 10 wherein said identifier is unique combination of base station IDs that are emitted by each base station in said base station set.

14. The wireless subscriber device of claim 10 wherein said microcomputer is further operable to perform said second event in advance of a timing of said first event.

15. The wireless subscriber device of claim 10 wherein said second event includes a warning of an upcoming appointment to a user.

16. The wireless subscriber device of claim 10 wherein said second event includes issuing a travel time estimate to a user.

17. The wireless subscriber device of claim 10 wherein said microcomputer is further operable to store at least one additional location that is associated with each said identifier.

18. In a wireless subscriber device for use in a wireless system having a first base station set operable to wirelessly transmit across a first geographic range and a second base station set operable to wirelessly transmit across a second geographic range, a method for performing an action comprising the steps of:
  receiving first identifier from said first base station set when said device is in said first geographic range;
  receiving a second identifier from said second base station set when said device is in said second geographic range;
  storing a location that is associated with each said identifier;
  maintaining a first event associated with said first geographic range; and
  performing a second event when said device is in said second geographic range based on a relationship between said second geographic range and said first geographic range, and such that when said device is in said second geographic range a reminder is generated for said appointment at a time prior to said appointment, said time being substantially equal to an expected travel time from said second geographic range to said first geographic range.

19. The method of claim 18 further comprising the step of:
  receiving user input renaming a location associated with said identifier.

20. The method of claim 18 wherein said second event is performed in advance of a timing of said event.

21. The method of claim 18 wherein said second event includes issuing a warning of an upcoming appointment to a user.

22. The method of claim 18 wherein said second event comprises issuing a travel time estimate to a user.

23. A wireless communication system comprising:
  a first station set operable to wirelessly transmit across a first geographic range;
  a second base station set operable to wirelessly transmit across a second geographic range;
  a subscriber device operable to wirelessly receive a first identifier from said first base station set when said device is in said first geographic range and to receive a second identifier from said second base station set when said device is in said second geographic range; and
  said device operable to store a location that is associated with each said identifier, said device further operable to maintain an appointment associated with said first geographic range, such that when said device is in said second geographic range a reminder is generated for said appointment at a time prior to said appointment, said time being substantially equal to an expected travel time from said second geographic range to said first geographic range.

24. A computer-readable storage medium containing a set of instructions for an electronic device, for use in a wireless system that has a first base station set operable to wirelessly transmit across a first geographic range and a second base station set operable to wirelessly transmit across a second geographic range, the set of instructions characterized by the steps of:
  receiving a first identifier from said first base station set when said device is in said first geographic range;
  receiving a second identifier from said second base station set when said device is in said second geographic range;
  storing a location that is associated with each said identifier,
  maintaining a first event associated with said first geographic range; and
  performing a second event when said device is in said second geographic range based on a relationship between said second geographic range and said first geographic range, and such that when said device is in said second geographic range a reminder is generated for said appointment at a time prior to said appointment, said time being substantially equal to an expected travel time from said second geographic range to said first geographic range.

* * * * *